United States Patent
Martin et al.

(10) Patent No.: US 9,160,629 B1
(45) Date of Patent: Oct. 13, 2015

(54) MESH WIRELESS CONNECTIVITY

(71) Applicant: Sprint Communications Company L.P., Overland Park, KS (US)

(72) Inventors: Geoffrey Scott Martin, Overland Park, KS (US); Michael Philip Dougan, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/450,447

(22) Filed: Aug. 4, 2014

Related U.S. Application Data

(62) Division of application No. 13/353,003, filed on Jan. 18, 2012, now Pat. No. 8,848,558.

(51) Int. Cl.
| | |
|---|---|
| H04W 4/04 | (2009.01) |
| H04W 72/04 | (2009.01) |
| H04W 84/00 | (2009.01) |
| H04W 92/00 | (2009.01) |
| H04L 12/24 | (2006.01) |
| H04W 4/00 | (2009.01) |

(52) U.S. Cl.
CPC ............... *H04L 41/12* (2013.01); *H04W 4/005* (2013.01); *H04W 72/04* (2013.01); *H04W 84/005* (2013.01)

(58) Field of Classification Search
None
See application file for complete search history.

(56) References Cited

U.S. PATENT DOCUMENTS

| | | | |
|---|---|---|---|
| 6,327,472 B1 | 12/2001 | Westroos et al. | |
| 7,835,301 B1 * | 11/2010 | Maufer | 370/254 |
| 8,848,558 B1 | 9/2014 | Martin et al. | |
| 2006/0209682 A1 | 9/2006 | Filsfils et al. | |
| 2009/0010190 A1 * | 1/2009 | Gong | 370/311 |
| 2009/0296675 A1 | 12/2009 | Tenny et al. | |
| 2010/0297996 A1 | 11/2010 | Yokota | |
| 2014/0303807 A1 * | 10/2014 | Addepalli et al. | 701/1 |

OTHER PUBLICATIONS

Carrier IQ 2011 Carrier IQ, Inc. Accessed Jan. 18, 2012, http://www.carrieriq.com/index.htm.
Seo, Dongback, "Organizational Strategies for Information and Communications Technology Standards", Published 2008, 427 pages.
CDMA—Code Division Multiple Access, Copyright 2015 CDG, 1 page. Last accessed Mar. 13, 2015 at: http://www.cdg.org/technology/cdmatechnology.asp.
GPRS—General Packet Radio Service, 2 pages. Last accessed Mar. 13, 2015 at: http://www.telecomspace.com/datatech-gprs.html.
GSM—Global System for Mobile Communications (Groupe Special Mobile), Copyright 2015, 2 pages. Last accessed Mar. 13, 2015 at: http://www.gsma.com/aboutus/gsm-technology/gsm.
IPv6—Internet Protocol, Version 6, Specification, RFC 2460, Published Dec. 1998, 39 pages Last accessed Mar. 13, 2015 at: http://tools.ieff.org/html/rfc2460.

(Continued)

*Primary Examiner* — Omar Ghowrwal

(57) ABSTRACT

A method, system, and medium are provided for connecting wireless devices to a wireless network. The system includes at least one base station and wireless devices that are part of a wireless network. The base station is configured with a database that stores metrics for each wireless device. The base station may identify one or more wireless devices that are suitable to communicate data for each of wireless devices based on the stored metrics. The identified suitable wireless devices proxy communications for other wireless devices over the wireless network. The wireless devices are part of a package delivery truck.

20 Claims, 5 Drawing Sheets

(56) References Cited

OTHER PUBLICATIONS

IPv4 and IPv6—Internet Protocol Version Four and Six, RFC 791, Published Sep. 1981, 49 pages. Last accessed Mar. 13, 2015 at: http://tools.ieff.org/html/rfc791.

LTE—Long Term Evolution, Copyright 2015 GSMA, 1 page. Last accessed Mar. 13, 2015 at: http://www.cdg.org/technology/lte.asp.

TDMA—Time Division Multiple Access—FDMA versus TDMA versus CDMA, Copyright 2012, www.rfwireless-world.com, 6 pages. Last accessed Mar. 13, 2015 at: http://www.rfwireless-world.com/Terminology/FDMA-versus-TDMA-versus-CDMA.html.

TDMA—Time Division Multiple Access—TDMA Technology, Copyright 2012 Motorola, Inc., 12 pages Last accessed Mar. 13, 2015 at: http://www.motorolasolutions.com/web/Business/_Documents/static%20files/Why%20Digital%20White%20Paper%205%2008.pdf.

UMTS—Universal Mobile Telecommunications System, Published Jul. 2002, 5 pages. Last accessed Mar. 13, 2015 at: http://www.umtsworld.com/technology/overview.htm.

UMTS—Universal Mobile Telecommunications System—Difference Between GSM and UMTS, Published on or before Jun. 22, 2010 and updated Jul. 27, 2011, 9 pages. Last accessed Mar. 13, 2015 at: http://www.differencebetween.net/technology/difference-between-gsm-and-umts/.

USB—Universal Serial Bus, Copyright 2015 C2G, 5 pages. Last accessed Mar. 13, 2015 at: http://www.cablestogo.com/learning/connector-guides/usb.

Beal, Vangie, Wi-Fi—Wireless Fidelity, 4 pages. Last accessed Mar. 13, 2015 at: http://www.webopedia.com/TERM/W/Wi_Fi.html.

Mitchell, Bradley, Wi-MAX—Worldwide Interoperability for Microwave Access, Copyright 2015 About.com, 4 pages. Last accessed Mar. 13, 2015 at: http://compnetworking.about.com/od/wirelessinternet/g/bldef_wimax.htm.

Wi-Max—Worldwide Interoperability for Microwave Access, Technical Specifications, Copyright 2001-2015 WiMax Forum, 1 page. Last accessed Mar. 13, 2015 at: http://www.wimaxforum.org/resources/technical-specifications.

Bluetooth Basics, Copyright 2015 Bluetooth SIG, Inc., 2 pages. Last accessed Mar. 13, 2015 at: http://www.bluetooth.com/Pages/Basics.aspx.

ZigBee, Low-cost, low-power, wireless networking for device monitoring and control, Copyright 1996-2015, Digi International Inc., 2 pages. Last accessed Mar. 13, 2015 at: http://www.digi.com/technology/rf-articles/wireless-zigbee.

IEEE 802.11, Published and updated Aug. 14, 2003, 7 pages. Last accessed Mar. 13, 2015 at: http://archive.oreilly.com/wireless/2003/08/08/wireless_throughput.html.

IEEE Standard 802.16: A Technical Overview of the WirelessMAN™ Air Interface for Broadband Wireless Access, Published Jun. 4, 2002, 12 pages. Last accessed Mar. 13, 2015 at: http://www.ieee802.org/16/docs/02/C80216-02_05.pdf.

Brenner, Pablo, A Technical Tutorial on the IEEE 802.11 Protocol, Published Jul. 18, 1996, 24 pages. Last accessed Mar. 13, 2015 at: http://www-users.cselabs.umn.edu/classes/Fall-2014/csci4211/Lecture-Notes/802.11-tutorial.pdf.

IEEE 802.11—How 802.11 Wireless Works, Published and updated Mar. 28, 2003, 10 pages. Last accessed Mar. 13, 2015 at: https://technet.microsoft.com/en-us/library/cc757419(d=printer,v=ws.10).aspx.

First Action Interview Pre-Interview Communication dated Oct. 7, 2014 in U.S. Appl. No. 14/446,627, 9 pages.

First Action Interview Office Action dated Dec. 17, 2014 in U.S. Appl. No. 14/446,627, 5 pages.

\* cited by examiner

MESH WIRELESS CONNECTIVITY

PRIORITY

This is a divisional of U.S. application Ser. No. 13/353,003, filed 18 Jan. 2012, entitled Mesh Wireless Connectivity, which is hereby incorporated in its entirety.

SUMMARY

A high-level overview of various embodiments of the invention are provided here for that reason, to provide an overview of the disclosure and to introduce a selection of concepts that are further described below in the detailed-description section below. This summary is not intended to identify key features or essential features of the claimed subject matter, nor is it intended to be used as an aid in isolation to determine the scope of the claimed subject matter. In brief and at a high level, this disclosure describes, among other things, ways to provide mesh devices having a machine-to-machine component (M2M) that is programmed to elect a mesh device as the transmitter.

The M2M component prohibits a mesh device from transmitting unless the mesh device is elected as the transmitter. Any data that needs to be sent to servers or devices on the wireless network is proxied by way of the mesh device that is elected as the transmitter. The other mesh devices connect to each other and the transmitter over near-field channels to create a mesh network. The data from the other mesh devices are communicated to the transmitter over the mesh network. In turn, the transmitter connects to the wireless network and delivers the data received over the mesh network from the other mesh devices. At least one of the mesh devices is selected as the transmitter based on metrics like location, signal strength, temperature, interference, etc. Periodically, the mesh devices reevaluate the selected transmitter to determine if another mesh device in the mesh network is more suitable. In certain embodiments, the M2M component may be installed on mesh devices, cargo, trucks, network components, communication nodes, etc.

BRIEF DESCRIPTION OF THE SEVERAL VIEWS OF THE DRAWINGS

Illustrative embodiments of the invention are described in detail below with reference to the attached drawing figures, and wherein.

DETAILED DESCRIPTION

Figure 1:
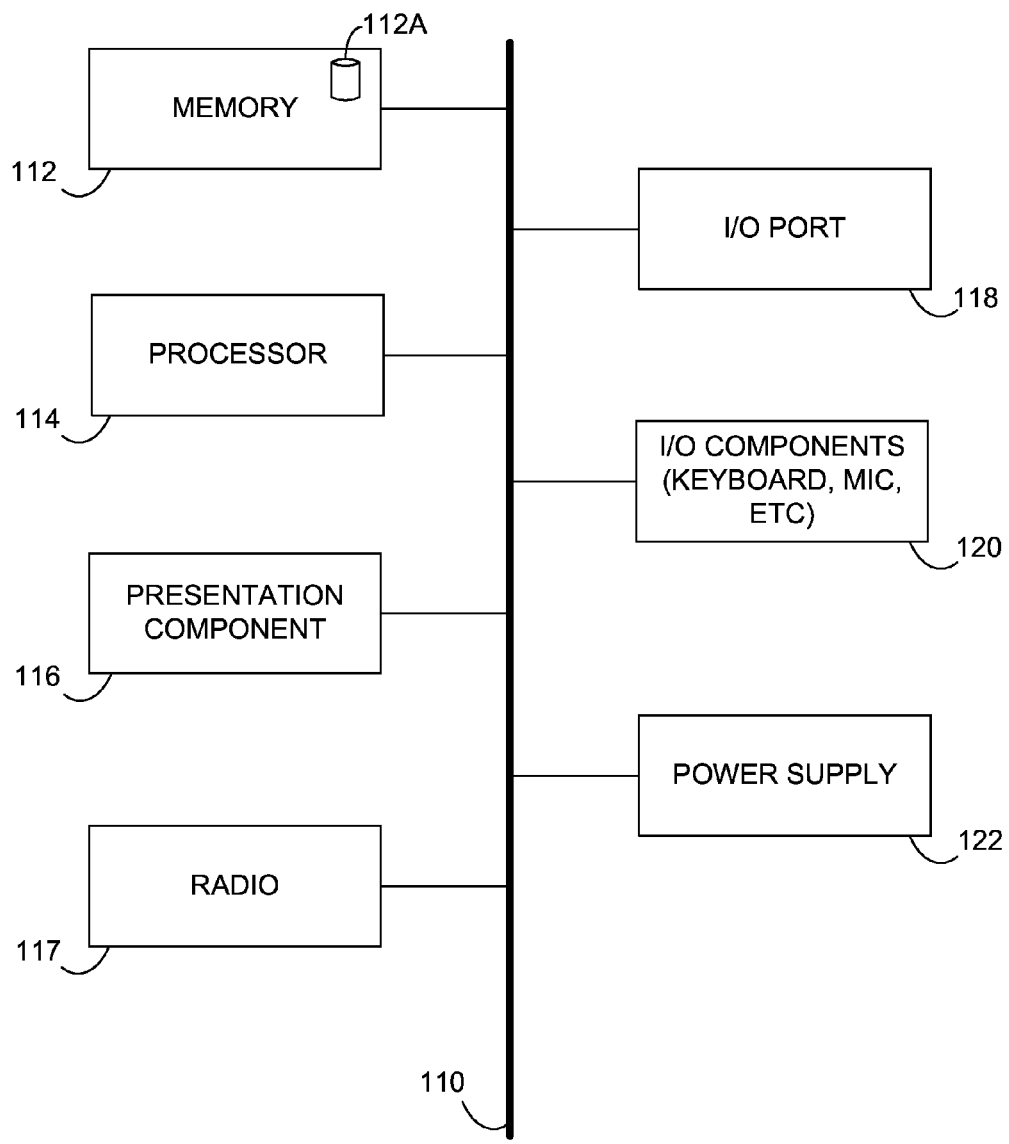
FIG. 1 depicts a block diagram of an exemplary mesh device in accordance with embodiments of the invention.

The subject matter of the patent is described with specificity herein to meet statutory requirements. However, the description itself is not intended to define the invention, which is what the claims do. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed, unless and except when the order of individual steps is explicitly described.

Embodiments of the invention are directed to mesh devices configured with M2M components. The mesh devices may include wireless devices, home appliances, washers, dryers, consumer electronics, vending machines, vehicle or shipment tracking devices, digital books, image and video recorders, etc. The M2M component may include communication interfaces, storage, and processors for executing instructions. The M2M component provides the mesh devices with access to several communication networks, including a mesh network and wireless network. Based on the metric measured by the M2M components, the mesh device may be elected as a transmitter by other mesh devices in the mesh network. Accordingly, metrics like location, temperature, power, orientation, signal strength, and interference associated with the mesh device, may be tracked to determine which of the mesh devices is suitable to operate as the transmitter at any given moment.

For instance, an M2M component in a vehicle may be connected to a first wireless network. Before the M2M component begins a communication stream over the wireless device, the M2M component may determine whether the vehicle is a suitable transmitter based on the metrics monitored by the M2M component of the vehicle. When the M2M component determines that another mesh device in the mesh network of the vehicle is suitable and the vehicle is unsuitable, the M2M component of the vehicle transmits the communication stream over the mesh network to the other mesh device. Operating as a proxy, the other mesh device transmits the communication stream received from the vehicle over the wireless network.

In one embodiment, the suitable mesh device operates as both the transmitter and receiver. The communications from the mesh network are communicated via the suitable mesh device. The communications to mesh devices on the mesh network from the wireless network are received by the suitable mesh device. In certain embodiments, the transmitter and receiver may be different mesh devices that are part of the mesh network.

Throughout this patent, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the embodiments of the invention. The following is a list of these acronyms:

ATM Automated Teller Machine
BTS Base Transceiver Station
CDMA Code Division Multiple Access
CD-ROM Compact Disc, Read Only Memory
DVD Digital Versatile Disc
EEPROM Electrically Erasable Programmable Memory
GPRS General Packet Radio Service
GSM Global System for Mobile communications (Groupe Special Mobile)
IP Internet Protocol
IPv4 Internet Protocol Version Four IPv6 Internet Protocol Version Six
LED Light Emitting Diode
LTE Long Term Evolution
M2M Machine-to-Machine
PDA Personal Data Assistant
RAM Random Access Memory
ROM Read Only Memory
RNC Radio Network Controller
TDMA Time Division Multiple Access
UMTS Universal Mobile Telecommunications System
USB Universal Serial Bus
Wi-Fi Wireless Fidelity
WiMAX Worldwide Interoperability for Microwave Access Embodiments of the invention can take the form of a method, sever, network device, system, or computer-readable media embodied with a specific set of computer-executable instructions. Computer-readable media include both volatile and nonvolatile media, removable and nonremovable media, and contemplate media readable by a database, a switch, and various other network and computing devices. Computer-readable media include communication media and computer storage media implemented in any method or technology that stores information. Examples of stored information include computer-useable instructions, data structures, program components, and other data representations. Examples of computer-readable media include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. The computer-readable media can store data momentarily, temporarily, or permanently.

In one embodiment, the mesh device is configured with several input and output components. Additionally, an M2M component may be installed in the mesh device. The M2M component may include applications for communicating with different networks. The M2M component may utilize the input and output component of the mesh device to implement operations requested by the applications of the M2M component. The M2M component may allow the mesh device to switch between communication networks maintained by disparate carriers. The mesh device having the M2M component is also configured to dynamically elect at least one transmitter and receiver based on the metrics monitored for each mesh device in a mesh network. Thus, the mesh devices may periodically change the transmitter or receiver for each device in the mesh network.

FIG. 1 depicts a block diagram of an exemplary mesh device in accordance with embodiments of the invention. Turning now to FIG. 1, a block diagram of an illustrative mesh device is provided and referenced generally by numeral 100. Although some components are shown in the singular, they may be plural. For example, mesh device 100 might include multiple processors or multiple radios, etc. A mesh device 100 may be one of many devices, including, but not limited to, a wireless phone, vending machine, video and image capture device, a laptop, a PDA, a handheld device, smart meters, vehicle tracking components, e-books, ATMs, consumer electronics, etc. As illustratively shown, mesh device 100 includes a bus 110 that directly or indirectly couples various components together including memory 112, a processor 114, a presentation component 116, a radio 117, input/output ports 118, input/output components 120, and a power supply 122.

We previously have described various memory components that memory 112 might take the form of. Memory component 112 can include any type of medium that is capable of storing information (e.g., a database 112A). The database 112A may be configured to store provisioning credentials, including a network identifier; metrics associated with each mesh device 100 in a mesh network; and any information that the mesh device transmits to the wireless network. The database 112A may also store applications associated with an M2M component installed on the mesh device 100. Processor 114 might actually be multiple processors that receive instructions associated with the applications and process the instructions accordingly. Presentation component 116 includes the likes of a display, a speaker, as well as other components that can present information (such as a lamp (LED), or even lighted keyboards).

The M2M component utilizes the communication interfaces of mesh device 100 to receive data from network resources on the communication network. In an embodiment, an application on the M2M component monitors various metrics, including, but not limited to, location, time of day, day of week, bandwidth, data transmission speeds, mesh device velocity, mesh antenna orientation, interference, signal strength, battery power, etc. The metrics for each device in the mesh network may be collected and stored in the database 112A by the M2M component. Once the metrics are collected from each mesh device 100 in the mesh network, the M2M component may identify at least one of the mesh devices 100 as a transmitter or receiver for all mesh devices 100 in the mesh network. In turn, the mesh device 100 checks whether it is identified as the transmitter or receiver. If it's identified as the transmitter or receiver, the mesh device 100 retains the network identifier that it already had for connecting to the wireless network. If the mesh device 100 does not have the network identifier, the mesh device 100 obtains the network identifier from the other mesh device that previously operated as the transmitter or receiver for the mesh network.

In another embodiment, the M2M component receives a notification from a remote server on a wireless communication network that the mesh device may connect to. The remote server utilizes metrics obtained from each mesh device to identify a suitable device. The notification includes an identifier for the mesh device that should be the transmitter or receiver for the mesh network. The notification may be broadcasted to each of the devices in the mesh network.

In some embodiments, the network resources on the wireless communication network may be the remote server, a database, or multimedia content available at different websites. The communication interface of the mesh device 100 may be a radio 117 that facilitates communication with a wireless telecommunications network. Illustrative wireless telecommunications technologies include CDMA, GPRS, TDMA, GSM, WIMAX, LTE, UMTS, and the like. In some embodiments, radio 117 might also facilitate other types of wireless communications including Wi-Fi communications; Bluetooth™, Zigbee, or other near-field communication.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mesh device 100. Power supply 122 includes items such as batteries, fuel cells, or any other component that can act as a power source to power mesh device 100.

Accordingly, a mesh device 100 may operate on at least two networks based on the metrics associated with each mesh device in the mesh network. The mesh device 100 may operate as a proxy for other mesh devices based on metrics associated with each mesh device. Operating as a proxy, the mesh device 100 may receive data from a wireless network that is destined for other mesh devices in the mesh network and transmit data from the other mesh devices to the wireless network. It will be understood and appreciated by those of ordinary skill in the art that the network device 100 shown in FIG. 1 is merely an example of one suitable mesh device 100 and is not intended to suggest any limitation as to the scope of use or functionality of the embodiments of the invention. Neither should the mesh device 100 be interpreted as having any dependency or requirement related to any single component or combination of components illustrated therein. The single unit depictions are meant for clarity, not to limit the scope of embodiments in any form.

Mesh networks may be used to leverage efficiencies, such as least cost routing that conserve data usage, by identifying one or more mesh devices that operate as the backhaul to a wireless network rather than all wireless modules of the mesh devices sending data to a wireless network. Users of the wireless network having multiple devices do not want to have a dedicated plan for each mesh device. For instance, a user with 100 mesh devices in a warehouse may prefer to have one or two service plans for all 100 mesh devices. Thus, the M2M modules of the mesh devices that implement embodiments of the invention enhance a user's experience while simultaneously reducing a service provider's network costs by eliminating unnecessary network traffic to simply maintain session persistence for all 100 mesh devices.

Figure 2:
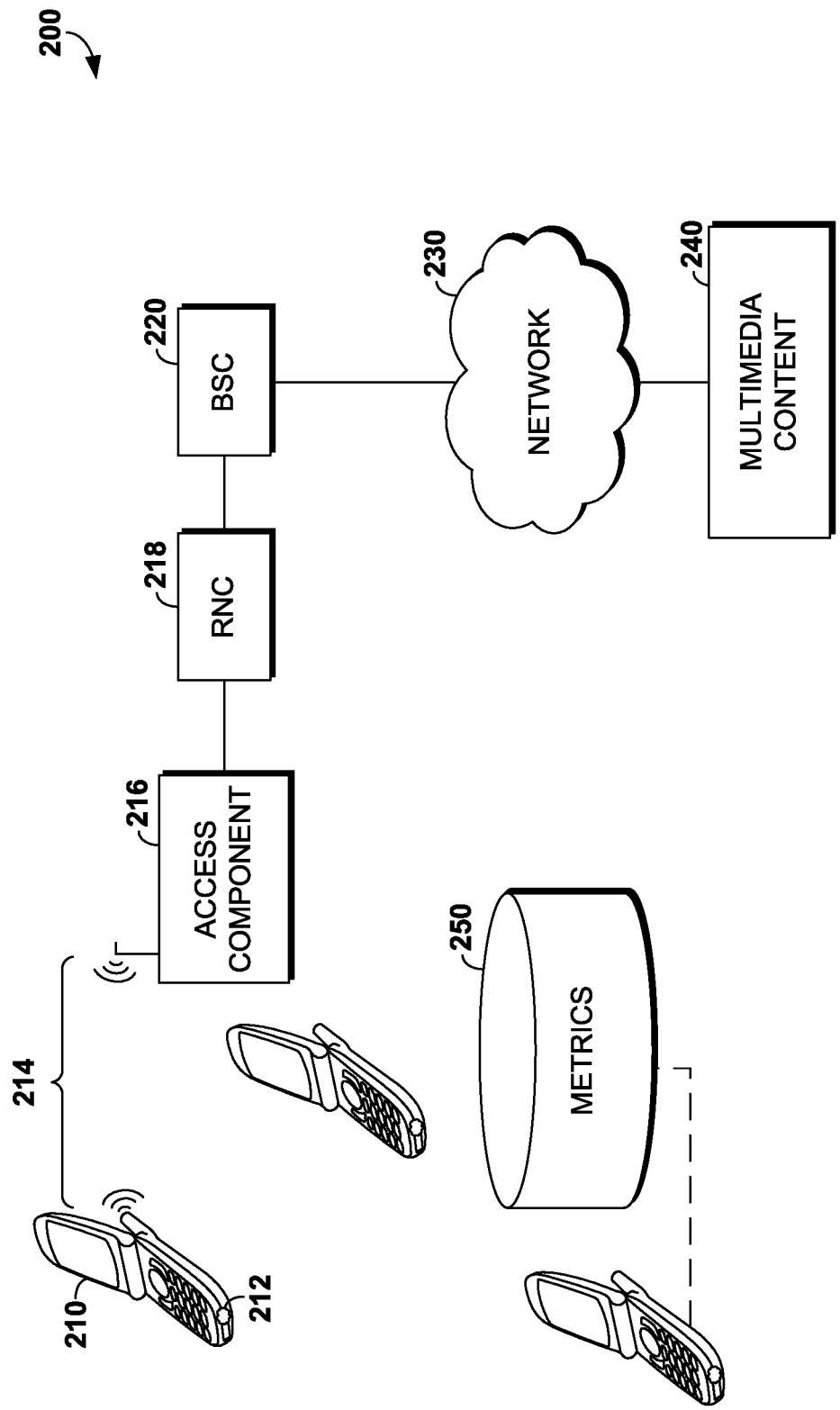
FIG. 2 depicts a network diagram of an exemplary communication system in accordance with embodiments of the invention.

FIG. 2 depicts a network diagram of an exemplary communication system 200 in accordance with embodiments of the invention. Turning now to FIG. 2, an illustrative computing system 200 is provided and referenced generally by the numeral 200, which depicts an illustrative operating environment for identifying at least one mesh device 210 that operates as the suitable transmitter or receiver for the network 230. The computing system 200 may include a mesh device 210, access components 216, RNC 218, BSC 220, network 230, multimedia content 240, and metric database 250.

Mesh device 210 executes an M2M application 212 that automatically determines whether the mesh device 210 is the most suitable device to transmit data to, or receive data from, the network 230. In one embodiment, the M2M application 212 monitors the metrics to determine which mesh device 210 in a mesh network is a suitable transmitter or receiver. In turn, the M2M application 212 may utilize network credentials from storage on the mesh device 210 when the mesh device 210 is identified as the most appropriate transmitter or receiver for each device in the mesh network. The M2M application 212 may, in other embodiments, utilize network credentials received over the mesh network from another mesh device 210 that previously operated as the transmitter or receiver for the mesh network.

Mesh devices 210 communicate among themselves over a near-field channel to exchange metrics and circulate network identifier information. In one embodiment, the mesh device 210 that is identified as the transmitter or receiver is the only device that may utilize the network identifier information. The mesh device may include a database 250 that stores metrics monitored by the mesh device 210. The metrics may include both device metrics and network metrics. The device metrics include temperature, battery power, antennae orientation, location, memory usage, etc. The network metrics include signal strength, interference, bandwidth, etc. Based on a combination of the device and network metrics, a mesh device 210 is identified as a suitable transmitter or receiver.

Mesh device 210 communicates with an access component 216 by way of communication links 214. Communication link 214 may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi connection to a device (e.g., wireless hotspot) that provides access to a wireless communications network, such as a WLAN connection using 802.11 protocol. A long-range connection may include a connection using one or more of CDMA, GPRS, GSM, TDMA, and 802.16.

Generally, the access component 216 provides access to what some skilled artisans refer to as a wireless communications network 230. The access component 216 may be one or more of a base transceiver station (BTS) tower, a Wi-Fi Router, and any other device that facilitates communication between mesh device 210 and network 230. In one embodiment, the access component 216 includes both a Wi-Fi Router and a BTS tower. In another embodiment, access component 216 is a BTS tower. A radio network controller (RNC) 218 performs various functions, such as managing radio channels, power control, load control, admission control, packet scheduling, handover control, macrodiversity, security functions, and mobility management. A base station controller (BSC) 220 is also shown in FIG. 2. The BSC 220 acts as the intelligence behind base transceiver stations (BTS) (not shown), and handles allocation of radio channels, receives measurements associated with the device metrics and network metrics from mesh devices 210, and controls handovers from one BTS to another BTS. In one embodiment, the BSC 220 may identify one or more mesh devices 210 as the suitable transmitter or receiver for the mesh network.

The components illustrated in FIG. 2, such as those that may be included in a wireless communications network 230 include network resources and multimedia content 240 accessible via the wireless communications network 230. The network 230 may be a IP network operating one or both of IPv4 and IPv6. The multimedia content may include websites, videos, applications, etc., that are accessible by the mesh devices 210.

The illustrated elements of computing system 200 are meant to be exemplary in nature, and the various lower-level details of the elements are not elaborated on so as to not obscure the embodiments of the invention. Clearly, some of the elements may be absent in some embodiments of the invention, and additional elements not shown may also be part of computing system 200. Attempting to show all of the various elements of computing system 200 would obscure certain novel aspects, and we will refrain from such elaboration at least for the sake of brevity.

The mesh device or a remote server, e.g., BSC, identifies, periodically, the suitable mesh device on the mesh network that may operate as the transmitter or receiver for each mesh device in the mesh network. The identification of the mesh device is based on several factors including, but not limited to: movement, proximity, weather conditions, physical obstructions, and interfering radio frequencies. Upon identifying the suitable mesh device, the devices on the mesh network proxy communications to and from the wireless network by way of the identified mesh device.

Figure 3:
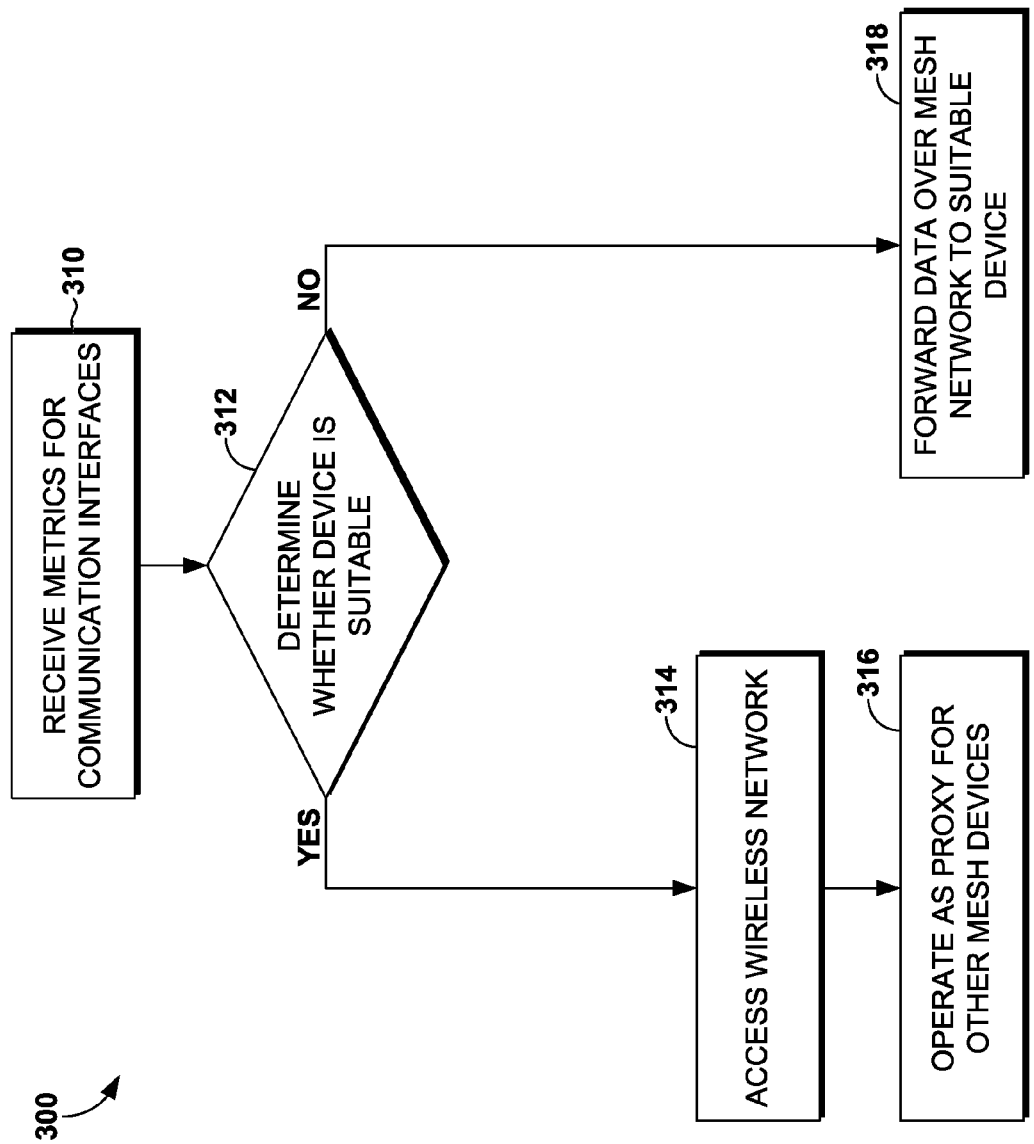
FIG. 3 depicts an exemplary logic diagram for connecting mesh devices executed by the M2M components in accordance with embodiments of the invention.

FIG. 3 depicts an exemplary logic diagram 300 for connecting mesh devices executed by the M2M components in accordance with embodiments of the invention. Turning now to FIG. 3, in step 310 a mesh device in the mesh network receives metrics associated with one or more communication interfaces on the mesh device. The mesh device may also receive metrics from other mesh devices in the mesh network. The metrics may include any combination of the following: signal strength, interference, location, antennae direction, temperature, and power. In one embodiment, the metrics are stored by each mesh device in the mesh network. The signal strength may be measured in a number of decibels measured for the wireless signal to the wireless network. The location is current GPS or triangulation of the mesh device. The antennae direction is an up or down orientation of the antennae on the mesh device. The interference is a measure of the percent loss of a signal based on weather, other signals, or any other obstructions. The temperature includes a measure of the mesh device's heat or coolness. Each mesh device in the mesh network may have a database that stores at least the above metrics for all mesh devices in the mesh network.

In turn, the mesh device determines, periodically, whether the mesh device in the mesh network is suitable to temporarily connect to, and transmit or receive data over, a wireless network based on the metrics, in step 312. In certain embodiments, to determine whether a mesh device is suitable, the mesh device may compare the metrics for each device against all other mesh devices and identify the suitable mesh device having a largest overall score based on the comparison of the metrics. The comparison may include determining whether thresholds for each metric are achieved, tallying the number of achieved thresholds, and identifying the device with the largest count. For instance, the thresholds may include highest signal rating available, e.g., 3 db by all mesh devices; a level of interference less than 30%; location measured in distance from the access component, e.g. less than 20 feet; antennae direction up; temperature between four and nine degrees Celsius; and power of at least 75%. The devices that achieve each of these thresholds are identifies as suitable. In some embodiments, among the suitable devices the mesh device with the best metrics overall is selected as the transmitter and receiver for the network. That is, the device with the largest signal strength, least interference, closest location to the access point, correct antennae direction, mean temperature, and largest power.

When the mesh device is identified as suitable, in step 314, the mesh device accesses the wireless network based on network credentials stored on the mesh device or obtains the credentials from the previous transmitter or receiver for the mesh network. The mesh device then operates as a proxy for the other mesh devices in the mesh network in step 316.

When the mesh device is identified as unsuitable, the mesh device forwards data to one or more of the suitable mesh devices over the mesh network and allows the one or more suitable mesh devices to proxy the data to the wireless network, in step 318. Additionally, the mesh device may transmit a network identifier from the mesh device to one or more other mesh devices selected as suitable when the mesh device was recently suitable but is no longer the suitable based on the metrics. In some embodiments, at least one mesh device is selected as the suitable mesh device. The other mesh devices may be identified as unsuitable mesh devices in the database via a flag entry. Thus, the flagged mesh devices may be prohibited from transmitting data over the wireless network.

In accordance with several embodiments of the invention, the logic executed by each M2M component of the mesh devices within a mesh network constantly evaluates the metrics, such as, signal strength, location, orientation, RF interference, temperature, etc. Based on the evaluation, at least one mesh device is selected as the transmitter or receiver for the mesh network. In some embodiments, the identification logic associated with the mesh device may execute completely on the mesh device. In other embodiments, the logic may be executed completely on a remote server. In yet another embodiment, the logic may be executed among the mesh devices and the remote server.

In certain embodiments, the remote server is a base station executing application logic that allows a large group of mesh devices to proxy communication by way of at least one suitable mesh device. The at least one suitable mesh device is the only device in the mesh network that transmits data to, or receives data from, the wireless network. The remote server may have a database storing each metric for the mesh devices. In some embodiments, the metrics are periodically pushed to the remote server, or pulled from the mesh device, as part of a control or network registration handshake between the mesh devices and remote sever.

Figure 4:
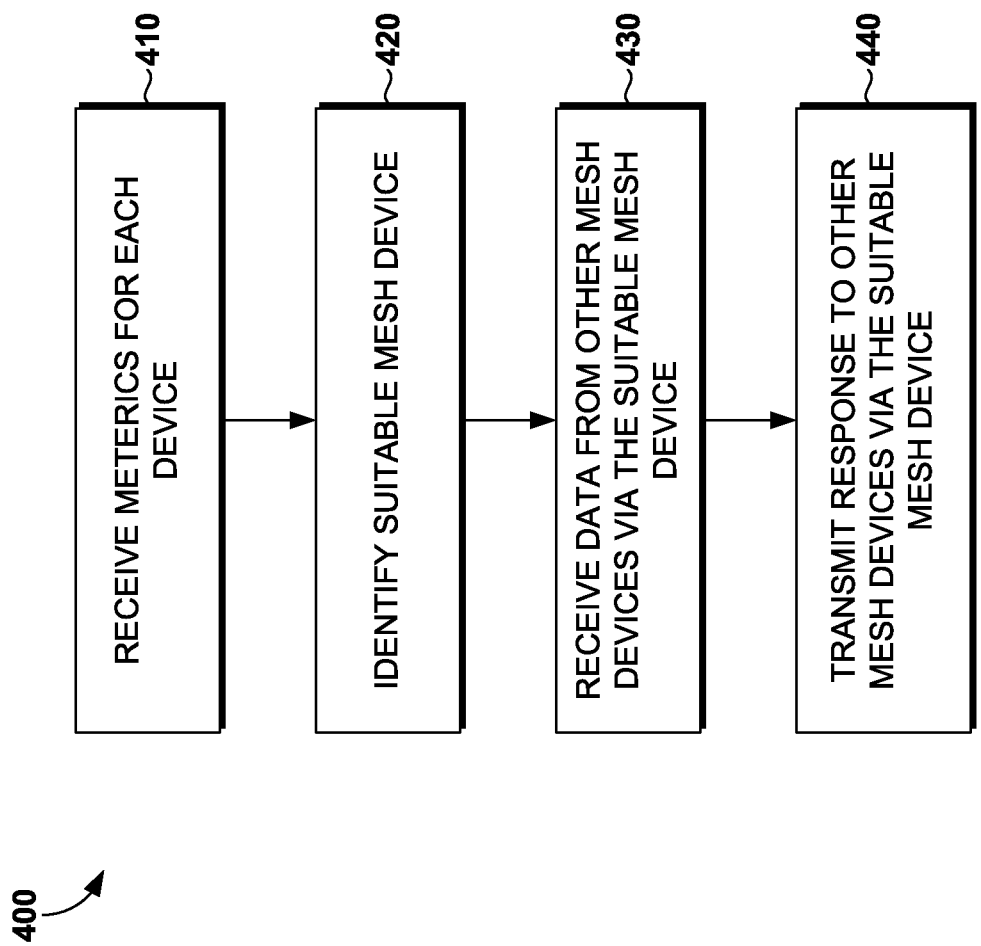
FIG. 4 depicts another exemplary logic diagram for connecting mesh devices executed by the M2M components in accordance with embodiments of the invention.

FIG. 4 depicts another exemplary logic diagram for connecting wireless devices executed by the M2M components in accordance with embodiments of the invention. Turning now to FIG. 4, in step 410, the access component, e.g., base station, receives metrics for each mesh device in a mesh network. In step 420, the base station identifies at least one suitable mesh device. The remote server, in step 430, receives data for other mesh devices in the mesh network by way of the at least one suitable mesh device. In turn, in step 440, the remote server transmits responses from the wireless network to the other mesh devices by way of the at least one suitable mesh device. In certain embodiments, the at least one suitable mesh device is configured to be a receiver for each of the mesh devices in the mesh network and the at least one mesh device receives data from the base station over the wireless network for each of the mesh devices. In other embodiments, at least one suitable mesh device is configured to be a transmitter for the mesh network and the at least one mesh device transmits data from each mesh device over the wireless network to the base station. Thus, the mesh network may have at least one transmitter and at least one receiver that are suitable to connect to the wireless network base on the metrics.

In another embodiment, the remote server may periodically determine if another mesh device is a more suitable mesh device for operating as a proxy. Thus, different mesh devices may operate as proxy transmitter or receiver for the mesh devices in the mesh network. The at least one suitable mesh device identified by the remote server utilizes a network identifier to communicate with the wireless network. The network identifier may be transmitted among the mesh devices via the mesh network. The mesh device that stores the network identifier should be the device is identified as the suitable mesh device.

Many the embodiments of the invention include several business applications, including package delivery. For example, in a truck delivery environment there may be multiple trucks configured with the M2M component. Each of the trucks is configured with network capabilities based on the M2M component installed in the truck. The M2M components would know how many trucks are part of their mesh network and are configured to communicate with each other using the mesh network to determine which truck has the cleanest signal to send package delivery information stored by the components on each truck over a wireless network. The wireless network connects to the central computer that processes the package delivery. The central computer may be at a corporate headquarters associated with the trucks.

Figure 5:
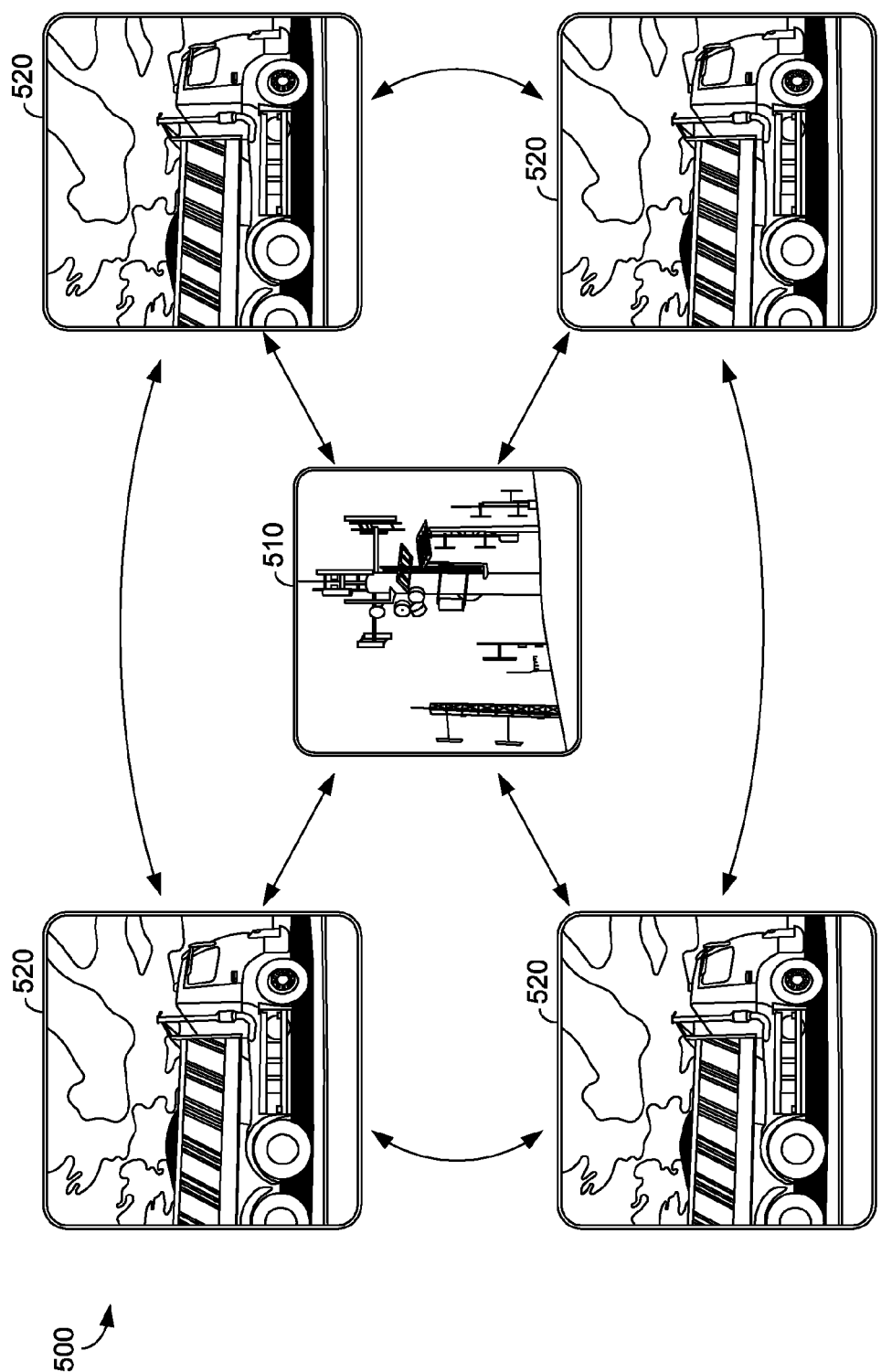
FIG. 5 depicts an exemplary network diagram for connecting trucks in a mesh network in accordance with embodiments of the invention.

FIG. 5 depicts an exemplary network diagram for connecting trucks in a mesh network in accordance with embodiments of the invention. The mesh network includes trucks 520. The trucks are equipped with the M2M component. In turn, at each truck, the M2M component identifies the at least one truck in the mesh network that is the suitable transmitter for all trucks in the mesh network. That truck receives data, e.g., package delivery information, from all other trucks in the mesh network. In turn, the at least one suitable truck transmits the data to the corporate headquarters over the wireless network 510 and receives responses from the wireless network for the other trucks that are proxied via the mesh network and wireless network.

In summary, an M2M component on the mesh device may allow a mesh device to connect to a wireless network based on metrics associated with the mesh device and the wireless network. A mesh device identified as suitable proxies communications for other mesh devices in the mesh network. Thus, at least one suitable mesh device is utilized to transmit data from the other mesh devices to the wireless network.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The technology claimed is:

1. A computer-implemented method of connecting machine-to-machine (M2M) components in delivery vehicles, the method comprising:
    storing, in a database, metrics for each delivery vehicle having near-field channel interfaces and wireless interfaces;
    identifying one or more delivery vehicles that are suitable to communicate data for each of the delivery vehicles;
    establishing a mesh network of delivery vehicles over the near-field channel interfaces;
    calculating, at each delivery vehicle, the metrics;
    transmitting the calculated metrics to a central station; and
    receiving, from said central station, identities of delivery vehicles that are suitable for communicating to the central station over a wireless network such that the identified delivery vehicles receive package delivery information from all other delivery vehicles in the mesh network for transmission to the central station.

2. The method of claim 1, wherein the metrics include any combination of the following: signal strength, interference, location, antennae direction, temperature, and power.

3. The method of claim 2, wherein the metrics are stored by each delivery vehicle.

4. The method of claim 2, further comprising:
    providing a network identifier from a first delivery vehicle in a mesh network to the selected suitable delivery vehicle over the mesh network when the selected suitable delivery vehicle replaces the first delivery vehicle as the suitable delivery vehicle.

5. The method of claim 2, wherein each delivery vehicle in the mesh network has a database that stores the metrics for all delivery vehicles in the mesh network.

6. The method of claim 2, wherein at least one delivery vehicle is selected as the suitable delivery vehicle.

7. The method of claim 6, wherein the suitable delivery vehicle is determined dynamically each time the delivery vehicle attempts to transmit data to the wireless network.

8. The method of claim 7, wherein the suitable delivery vehicle is part of a delivery truck and the suitable delivery truck is determined dynamically each time the delivery truck attempts to connect to the wireless network and the unsuitable delivery trucks in the mesh network are prohibited from transmitting data over the wireless network.

9. One or more non-transitory computer-storage media storing computer-usable instruction for causing one or more processors to perform a computer-implemented method of connecting machine-to-machine (M2M) components in delivery vehicles, the method comprising:
    storing, in a database, metrics for each delivery vehicle having near-field channel interfaces and wireless interfaces;
    identifying, by a central station, one or more delivery vehicles that are suitable to communicate data for each of the delivery vehicles;
    establishing a mesh network of delivery vehicles over the near-field channel interfaces;
    calculating, at each delivery vehicle, the metrics;
    transmitting the calculated metrics to the central station; and
    receiving, from said central station, identities of deliver vehicles that are suitable for communicating to the central station over a wireless network such that the identified delivery vehicles receive package delivery information from all other delivery vehicles in the mesh network for transmission to the central station.

10. A communication system for connecting M2M (machine-to-machine) components installed in delivery vehicles, the system comprising:
    a central station configured to store a database of metrics for each delivery vehicle, the central station identifies one or more delivery vehicles that are suitable to communicate data for each of the delivery vehicles; and
    two or more delivery vehicles having near-field channel interfaces and wireless interfaces, wherein the delivery vehicles calculate metrics that are communicated to the central station and receive from said central station identities of delivery vehicles that are suitable for communicating to the central station over a wireless network such that the identified delivery trucks receive package delivery information from all other delivery vehicles in a mesh network for the transmission to the central station.

11. The system of claim 10, wherein at least one delivery vehicle is configured to be a receiver for each of the delivery vehicles in the mesh network and the at least one delivery vehicle receives data from the central station over the wireless network for each of the delivery vehicles.

12. The system of claim 11, wherein at least one delivery vehicle is configured to be a transmitter for the mesh network and the at least one delivery vehicle transmits data from each delivery vehicle over the wireless network to the central station.

13. The system of claim 12, wherein the receiver and transmitter are the same delivery vehicle.

14. The system of claim 10, wherein the metrics include any combination of the following: signal strength, interference, location, antennae direction, temperature, and power.

15. The system of claim 11, wherein the metrics are stored by each delivery vehicle.

16. The system of claim 11, further comprising:
    providing a network identifier from a first delivery vehicle in the mesh network to the selected suitable delivery vehicle over the mesh network when the selected suitable delivery vehicle replaces the first delivery vehicle as the suitable delivery vehicle.

17. The system of claim 11, wherein each delivery vehicle in the mesh network has a database that stores the metrics for all delivery vehicles in the mesh network.

18. The system of claim 11, wherein at least one delivery vehicle is selected as the suitable deliver vehicle.

19. The system of claim 10, wherein the suitable deliver vehicle is determined dynamically each time the delivery vehicle attempts to transmit data to the wireless network and the unsuitable delivery vehicles in the mesh network are prohibited from transmitting data over the wireless network.

20. The system of claim 11, wherein the suitable delivery vehicle is part of a delivery truck.

\* \* \* \* \*